United States Patent [19]

Clark

[11] Patent Number: 5,648,844
[45] Date of Patent: Jul. 15, 1997

[54] LASER LIQUID LEVEL GAUGE WITH DIFFUSER

[75] Inventor: Reece Robert Clark, Redwood City, Calif.

[73] Assignee: Midland Manufacturing Corp., Skokie, Ill.

[21] Appl. No.: 559,837

[22] Filed: Nov. 20, 1995

[51] Int. Cl.$^6$ .......................... G01C 03/08; G01F 23/00
[52] U.S. Cl. .......................... 356/5.09; 250/577; 73/293
[58] Field of Search ............................ 356/4.09, 358, 356/356; 250/577; 73/293

[56] References Cited

U.S. PATENT DOCUMENTS

| | | |
|---|---|---|
| 3,598,492 | 8/1971 | Fruengel . |
| 3,649,123 | 3/1972 | Ulicki . |
| 3,730,628 | 5/1973 | Wolcott et al. . |
| 3,749,924 | 7/1973 | Vischulis . |
| 3,778,160 | 12/1973 | Wolcott . |
| 3,900,260 | 8/1975 | Wendt . |
| 3,909,131 | 9/1975 | Waters . |
| 4,068,952 | 1/1978 | Erbert et al. . |
| 4,180,323 | 12/1979 | Persson et al. . |
| 4,453,806 | 6/1984 | Wick . |
| 4,470,698 | 9/1984 | Green, Jr. et al. . |
| 4,501,961 | 2/1985 | Stauffer . |
| 4,689,489 | 8/1987 | Cole ........................................ 250/560 |
| 4,693,597 | 9/1987 | Shiomi et al. . |
| 4,721,384 | 1/1988 | Dietrich et al. . |
| 4,745,293 | 5/1988 | Christensen .................. 250/577 |
| 4,895,440 | 1/1990 | Cain et al. . |
| 5,006,721 | 4/1991 | Cameron et al. . |
| 5,054,319 | 10/1991 | Fling . |
| 5,076,687 | 12/1991 | Adelson . |
| 5,098,185 | 3/1992 | Watanabe et al. . |
| 5,166,747 | 11/1992 | Schroeder et al. . |
| 5,194,747 | 3/1993 | Culpepper et al. . |
| 5,257,090 | 10/1993 | Meinzer et al. ................. 356/358 |
| 5,282,014 | 1/1994 | Ruhl, Jr. et al. . |
| 5,305,237 | 4/1994 | Dalrymple et al. ................ 364/562 |
| 5,309,212 | 5/1994 | Clark . |
| 5,317,140 | 5/1994 | Dunthorn . |
| 5,406,842 | 4/1995 | Locke . |

*Primary Examiner*—Mark Hellner
*Attorney, Agent, or Firm*—Emrich & Dithmar

[57] ABSTRACT

The liquid level sensor includes a modulated laser diode and collimating optics for collimating the diode output to produce an optical measurement signal beam transmitted to the fluid boundary through a diffuser to diverge the beam. A detector detects reflections of the beam from the fluid boundary to produce an output signal which is amplified and inverted to drive the modulator. The frequency of the modulation, which depends on the distance to the fluid boundary, is measured and the distance is derived from that measurement.

18 Claims, 1 Drawing Sheet

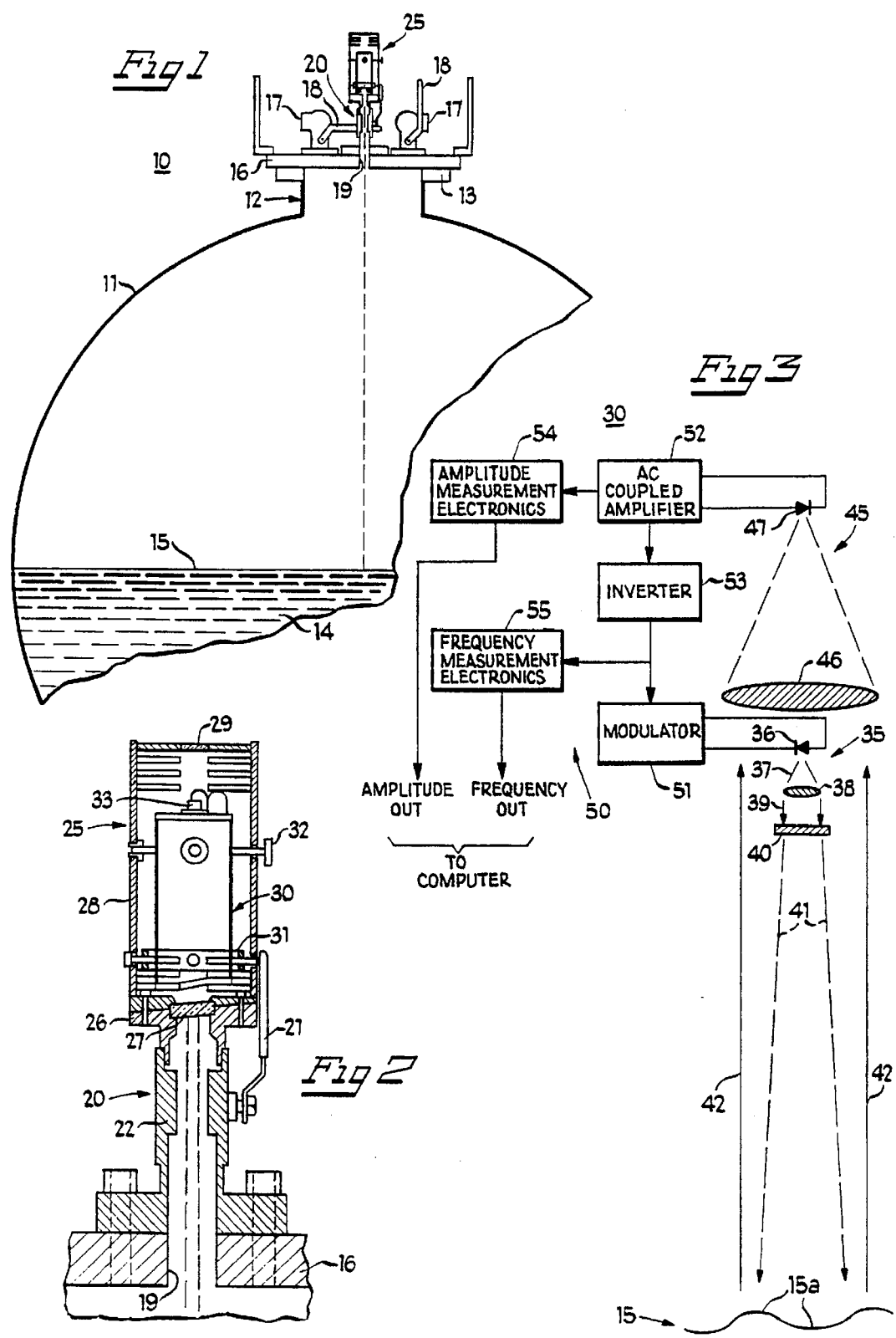

LASER LIQUID LEVEL GAUGE WITH DIFFUSER

BACKGROUND OF THE INVENTION

1. Field of the Invention

The present invention relates to level sensing and, more particularly to electro-optical devices for measuring the distance between a reference level and a variable surface, such as the surface level of liquid in a vessel.

2. Description of the Prior Art

A number of non-intrusive, optical level gauging techniques have been developed. Several of these common methods of distance measurement are based on the speed of light. One such method of deriving distance from the speed of light is to transmit an amplitude-modulated light beam and to compare the phase of the return signal with the phase of the outgoing signal. The relative phase of the two signals depends on the distance to the subject and the frequency of the modulation used. Such a technique is disclosed, for example, in U.S. Pat. No. 5,194,747. However, the accuracy of the phase comparison method is limited by the ability of the phase detector used to resolve phase and the amount of isolation that can be obtained between the incoming and outgoing signals.

Another type of distance measurement technique, disclosed in U.S. Pat. No. 5,309,212, measures distance by creating an oscillator with a source of projected energy and a sensor to detect this energy after it has traveled some distance. The detected signal is amplified and applied to the energy source to form a feedback loop which oscillates at a frequency which depends on the distance the energy travels and the speed at which it travels. The frequency can be measured, and either distance or speed determined if the other is known. This prior art technique produces a narrow optical beam that retains a diameter of less than a centimeter out to a distance of ten meters or so. It has been found to be very difficult to get such a beam lined up on a liquid surface so that a detectable reflection comes back into the detector.

SUMMARY OF THE INVENTION

It is a general object of the invention to provide an improved liquid level gauging apparatus which avoids the disadvantages of prior devices while affording additional structural and operating advantages.

An important feature of the invention is the provision of an optical distance measuring apparatus which does not rely on phase comparison and which can accurately measure liquid levels in a vessel.

In connection with the foregoing feature, a further feature of the invention is the provision of a liquid level gauge of the type set forth which permits accurate measurement of liquid levels by diffusing a collimated light beam.

It is a still further feature of the invention to provide a method of determining the level of a liquid in a vessel utilizing apparatus of the type set forth.

Certain ones of these and other features of the invention are attained by providing in an apparatus for measuring the level of a light-reflective fluid boundary in a vessel, including a transmitter for transmitting an optical measurement signal toward the fluid boundary, a receiver for detecting a reflection of the signal from the fluid boundary, and control circuitry for modulating the transmitted measurement signal and processing the received reflections for determining distance between the transmitter and the fluid boundary as a function of a parameter of the modulation, the improvement comprising: a diffuser disposed between the transmitter and the fluid boundary for diverging the optical measurement signal.

Further features of the invention are attained by providing apparatus for measuring the level of a light-reflective fluid boundary in a vessel, the apparatus comprising: a transmitter for transmitting an optical measurement signal beam toward the fluid boundary; a diffuser disposed between the transmitter and the fluid boundary for diverging the optical measurement signal beam; a detector for generating an output signal in response to detection of a reflection of the signal beam from the fluid boundary, the detector output signal being related to an amplitude of the detected reflection; a modulator coupled to the transmitter and to the detector for causing the transmitter to continually transmit the measurement signal beam at a first amplitude while the amplitude of the detected reflection is at a second amplitude, and causing the transmitter to continually transmit the measurement signal beam at a second amplitude while the amplitude of the detected reflection is at the first amplitude; and means for measuring the frequency of modulation of the signal beam, the frequency being indicative of the distance from the transmitter to the fluid boundary.

Still other features of the invention are attained by providing a method for measuring the level of a light-reflective fluid boundary in a vessel comprising the steps of: transmitting an optical measurement signal beam from a source toward the fluid boundary; diffusing the optical measurement signal beam before it reaches the fluid boundary; detecting a reflection of the signal beam from the fluid boundary; modulating the signal beam in response to the detected reflection, the modulating step including the steps of:

(a) causing the source to continually transmit the measurement signal beam at a first amplitude while the amplitude of the detected reflection is at a second amplitude, and (b) causing the source to continually transmit the measurement signal beam at the second amplitude while the amplitude of the detected reflection is at the first amplitude; and measuring a frequency of modulation of the signal beam, the frequency being indicative of a distance from the source to the fluid boundary.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary view in vertical section of a liquid-containing tank incorporating liquid level gauge apparatus in accordance with the present invention;

FIG. 2 is an enlarged, fragmentary, sectional view of the level gauge assembly of the tank of FIG. 1; and FIG. 3 is a functional block diagrammatic view of the laser level sensor of the level gauge assembly of FIG. 2.

DESCRIPTION OF THE PREFERRED EMBODIMENT

Referring to FIG. 1, there is illustrated a vessel, generally designated by the numeral 10, in the nature of a tank. The vessel 10 is illustrated as a railway car tank, but it will be appreciated that the principles of the present invention apply to other types of tanks or liquid-containing vessels. The vessel 10 has a generally cylindrical wall 11 provided at the upper end thereof with at least one manway 12 defining an opening into the vessel 10, the manway 12 having a laterally outwardly extending annular flange 13 at its upper end. Disposed in the vessel 11 is a volume of liquid 14 having a surface 15, the level of which is to be measured relative to a reference level. The surface 15 of the liquid 14 is the interface or boundary between the liquid and a gaseous phase above the liquid, which may be air or vapor, this interface being light-reflective in a known manner.

The manway 12 is provided with a cover 16 on which are mounted a pair of fill valves 17, each having a control handle 18. Referring also to FIG. 2, the manway cover 16 is also provided with a central aperture 19 therethrough which communicates with a ball valve assembly 20 secured on the cover 16. The ball valve assembly 20 has a control handle 21 and a stem tube 22 communicating with the aperture 19. Mounted on top of the ball valve assembly 20 is a level gauge assembly 25 in accordance with the present invention for detecting and measuring the level 15 of the liquid 14 in the vessel 10. More particularly, the level gauge assembly 25 includes a mounting flange 26 which seats a window 27 closing the upper end of the tube 22 and inclined slightly to the longitudinal axis thereof, for a reason to be explained below. The level gauge assembly 25 includes an encompassing heat shield or housing 28, provided at the upper end thereof with a viewing window 29.

Mounted within the heat shield 28 is a laser level sensor, generally designated by the numeral 30. The level sensor 30 is encased in its own housing supported on a gimbal 31 and provided with a gimbal adjuster 32. At the top of the laser level sensor 30 is a bubble level 33 positioned for viewing through the window 29 to permit accurate leveling of the sensor 30 by means of the gimbal adjuster 32. The laser level sensor 30 is substantially the same as the range finder disclosed in the aforementioned U.S. Pat. No. 5,309,212, modified by the addition of a diffuser, as will be explained below.

Referring also to FIG. 3, the laser level sensor 30 includes a transmitter, generally designated by the numeral 35, which includes a laser diode 36 disposed substantially at the reference level and emitting an uncollimated beam 37 of laser light. The transmitter 35 also includes collimating optics 38, through which the beam 37 is passed to produce a collimated beam 39.

It is a significant aspect of the present invention that the laser level sensor 30 includes a diffuser 40 disposed for diffusing and diverging the collimated beam 39. More particularly, the diffuser 40 is preferably of a type which diverges the collimated beam 39 into a conical beam 41 having a small half angle less than 5°, which beam constitutes an optical measurement signal beam which is transmitted to the surface 15 of the liquid 14, in a known manner. In a preferred embodiment of the invention, the divergence half angle of the beam 41 is in the range of from about 1° to about 2°. The beam 41 is reflected from the surface 15 as a reflected beam 42. It will be appreciated that, preferably, the laser level sensor 30 is aligned so that the transmitted measurement signal beam 41 is directed substantially perpendicular to the surface 15.

The laser level sensor 30 also includes a receiver, generally designated by the numeral 45, which includes collection optics 46, dimensioned and positioned for collecting a sufficient fraction of the reflected beam 42 to provide effective detection. The receiver 45 also includes a photodiode 47, disposed substantially at the reference level, onto which returning light is focused by the collecting optics 46, causing the photodiode 47 to generate an electrical output signal in a known manner.

The laser level sensor 30 also includes control circuitry 50 for controlling the operation of the laser diode 36 and processing the output signals from the photodiode 47. More particularly, the control circuitry 50 includes a modulator 51 coupled to the laser diode 36 for controlling the operation thereof, and an AC-coupled amplified 32 coupled to the photodiode 47 for amplifying the electrical output signal generated thereby. The output of the amplifier 52 is coupled to an inverter 53, the output of which is connected to the modulator 51. The outputs of the amplifier 52 and the inverter 53 are also, respectively, coupled to amplitude and frequency measurement electronics 54 and 55 for generating amplitude and frequency output signals, which are supplied to an associated computer (not shown) for suitable processing.

The operation of the control circuitry 50 is described in detail in the aforementioned U.S. Pat. No. 5,309,212, and only so much of the operation will be described herein as is necessary for an understanding of the present invention. The laser diode 36 is a light source controlled by the modulator 51 to produce a light beam that is one of two possible intensities, the greater "on" intensity typically being at least several times that of the lesser "off" intensity. The detected reflection signal, after amplification in the amplifier 52, is inverted in the inverter 53 to produce a signal which is either a logic level "1" or "0", which is input to the modulator 51 to drive the source 36. The amplification and inversion logic is such that when light above an average threshold level is falling on the photodiode 47, the laser diode 36 is switched off, and when the detected light falls below the average level, the laser diode 36 is switched on.

When operation begins, the laser diode 36 may be "on" or "off". The photodiode 47 and its amplifier 52 generate small signals from random noise which, at some point, switches the laser diode 36 to an opposite state. This transition, or edge, leaves the laser diode 36 and is reflected off the liquid surface 15 to the photodiode 47, the output of which is amplified and causes an opposite transition of the laser diode 36. This transition is, in turn, seen by the photodiode 47 and the cycle repeats continuously. Thus, no starting or drive logic is necessary for oscillation to begin or continue.

The period of oscillation of the system depends on the distance from the source or laser diode 36 to the liquid surface 15, the propagation speed, and the delay in propagating the signal from the photodiode 47 to the laser diode 36. The frequency measurement electronics 55 measures the period of these oscillations, which period may be stored and read by a computer system, which may convert the time to a distance.

As is explained in the aforementioned U.S. Pat. No. 5,309,212, various modifications or optional configurations of the laser level sensor 30 are possible. For example, instead of providing binary states for a continuous light beam emitted from the laser diode 36, the amplifier 52, inverter 53 and modulator 51 could be replaced by a pulse detector and a pulse driver (not shown) which would generate a pulsed output signal from the laser diode 36. Each outgoing pulse would be reflected from the liquid surface 15 and detected by the photodiode 47 and the associated pulse detector, which would then cause the pulse driver to apply a signal to the laser diode 36 to generate another outgoing pulse.

It will be appreciated that the window 27 of the level gauge assembly isolates the laser level sensor 30 from the contents of the vessel 10. As can be seen in FIG. 2, the mounting flange 26 mounts the window 27 at a slight angle to the axis of the laser level sensor 30 so that it will not be perpendicular to the axis of the transmitted measurement beam 41. Thus, the reflections from the window 27 directly back into the laser diode 36 are prevented. It will be appreciated that the angle of inclination of the window 27, and the divergence angle of the optical measurement beam 41 are shown exaggerated in the drawings for ease of illustration.

A fundamental difficulty with the use of the prior art range finding system disclosed in U.S. Pat. No. 5,309,212 for measuring the distance to a liquid surface, is that the inclination of the liquid surface does not remain fixed. Thus, the liquid surface 15 is subject to perturbations, indicated at 15(a) in FIG. 3, such as waves, ripples or the like. Such perturbations can result from a number of sources, such as movements of the vessel 10 or vibrations or oscillations imparted to the vessel 10, disturbance of the surface 15 during filling operations, and the like. Because of these perturbations, a small spot of light (typically having a diameter less than 1 cm.), such as that emitted by the collimating optics of the aforementioned U.S. Pat. No. 5,309,212, may be reflected from an inclined portion of a surface disturbance, so that an insufficient part of the incident light beam will be reflected to the collecting optics for detection.

Applicant has found that, by spreading the incident beam to produce a larger spot on the liquid surface 15, the amount of returning light collected by the collecting optics 46 can be significantly increased so as to be sufficient to afford effective detection. It would be possible to achieve the necessary divergence by substituting for the collimating optics 38 a lens slightly out of focus to produce a divergence of a few degrees, instead of the typical 20°–40° divergence of the beam 37 exiting the laser diode 36. However, applicant has found that the use of this divergence technique is very sensitive to slight tilting of the laser level sensor 30, resulting in decreased accuracy of the distance measurements. Accordingly, it is a significant aspect of the present invention that applicant has determined that the use of the diffuser 40 to effect beam divergence results in appropriate divergence without undue susceptibility to the angle of inclination of the laser level sensor 30.

It is theoretically possible to utilize light sources other than lasers in the present invention, such as LEDs, for example. However, such light sources are noisier and have slower response times than lasers and, therefore, have limited accuracy. It would also be possible to use a laser source other than a laser diode, such as a gas laser. This would have the advantage of obviating the collimating optics 38, since a gas laser produces collimated light. However, a gas laser would consume more space and power. While the laser diode 36 produces uncollimated light, it can be very easily collimated.

The diffuser 40 could be any of a number of different types of diffuser. However, it has been found that good results are achieved with a holographic diffuser, which actually consists of a pattern of negative focal length microlenses, each of which spreads a small portion of the outgoing beam 39. Thus, such a diffuser causes a remapping of all of the points of the beam spot entering the diffuser, so that the larger spot incident on the surface 15 of the liquid 14 will have the property that some light from every point on the spot entering the diffuser will reach every point on the surface 15 illuminated by the diverged spot. This results in a circular spot on the surface 15 without a central "hot spot", which can be a problem with other types of diffusers. Also, the holographic diffuser has a higher transmission efficiency than most others, so that strong detection readings can be obtained with laser power levels as low as 250 microwatts.

Also, various type of photodiodes 47 can be utilized, but it will be appreciated that the area and placement of the photodiode will have to be adjusted accordingly, depending on the type used. Thus, for example, it might be possible to utilize a relatively large area PIN photodiode or a small area avalanche photodiode.

The amount of divergence of the measurement beam 41 is a trade off among several factors. The wider the beam, the easier it is to pick up a reflection from the surface 15 and the less critical the alignment of the laser level sensor 30. However, with a wider diffusion, the beam strength per unit area decreases quite rapidly so that, at greater distances more laser power or a larger light collection aperture is required. Also, with a larger spot, the field of view of the collection optics 46 must be increased, which will result in loss of collection power. Furthermore, if the beam divergence is too great, it can start to hit obstructions in the vessel 10, such as the ball valve 20 or the manway cover 16 at the edges of the aperture 19, thereby producing undesired reflections. It has been determined that a measurement beam cone having a half angle of approximately 5° is probably the upper limit of beam divergence which can be obtained, while still collecting enough reflected light to provide effective detection. Good results have been obtained using a diffuser 40 which diffuses the beam 41 into a cone having a half angle of 1°. By the use of the level gauge assembly 25 of the present invention, it is possible to obtain measurement accuracy to +/−⅛ inch. The use of the diffuser 40 also has the advantage that it produces a round spot on the surface 15 of the liquid 14, whereas the beam 37 emitted by the laser diode 36 has an aspect ratio of about 3:1, giving an elliptical spot.

From the foregoing, it can be seen that there has been provided an improved optical liquid level gauge assembly which permits use of a collimated laser light ranging system, while still achieving accurate distance measurements to a disturbed liquid level surface.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In an apparatus for measuring the level of a light-reflective fluid boundary in a vessel, including a transmitter for transmitting an optical measurement signal toward the fluid boundary, a receiver for detecting a reflection of the signal from the fluid boundary, and control circuitry for modulating the transmitted measurement signal and processing the received reflections for determining distance between the transmitter and the fluid boundary as a function of a parameter of the modulation, the improvement comprising: a diffuser disposed between the transmitter and the fluid boundary for diverging the optical measurement signal.

2. The apparatus of claim 1, wherein the control circuitry includes means for determining the distance between the transmitter and the fluid boundary as a function of the modulation frequency.

3. The apparatus of claim 1, wherein the transmitter transmits a collimated optical signal.

4. The apparatus of claim 3, wherein the transmitter includes a laser light source.

5. The apparatus of claim 4, wherein the transmitter includes a laser diode for generating an uncollimated optical signal, and collimating optics for collimating the optical signal for the laser diode, the control circuitry determining the distance between the laser diode and the fluid boundary.

6. The apparatus of claim 3, wherein the diffuser diffuses the collimated optical signal into a conical signal having a half angle of about 1°.

7. The apparatus of claim 1, wherein the control circuitry includes means cooperating with the transmitter to generate a continuous optical signal measurement beam of varying amplitude.

8. The apparatus of claim 1, wherein the vessel has a windowed aperture through which the optical measurement signal and the reflections pass.

9. Apparatus for measuring the level of a light-reflective fluid boundary in a vessel, said apparatus comprising: a transmitter for transmitting an optical measurement signal beam toward the fluid boundary; a diffuser disposed between the transmitter and the fluid boundary for diverging the optical measurement signal beam; a detector for generating an output signal in response to detection of a reflection of the signal beam from the fluid boundary, the detector output signal being related to an amplitude of the detected reflection; a modulator coupled to the transmitter and to the detector for causing the transmitter to continually transmit the measurement signal beam at a first amplitude while the amplitude of the detected reflection is at a second amplitude, and causing the transmitter to continually transmit the measurement signal beam at a second amplitude while the amplitude of the detected reflection is at the first amplitude; and means for measuring the frequency of modulation of the signal beam, the frequency being indicative of the distance from the transmitter to the fluid boundary.

10. The apparatus of claim 9, wherein the transmitter transmits a collimated optical signal beam.

11. The apparatus of claim 10, wherein the transmitter includes a laser light source.

12. The apparatus of claim 11, wherein the transmitter includes a laser diode for generating an uncollimated optical signal, and collimating optics for collimating the optical signal for the laser diode, the control circuitry determining the distance between the laser diode and the fluid boundary.

13. The apparatus of claim 12, wherein the diffuser diffuses the collimated optical signal into a conical signal having a half angle of about 1°.

14. The apparatus of claim 9, wherein the vessel has a windowed aperture through which the optical measurement signal and the reflections pass.

15. A method for measuring the level of a light-reflective fluid boundary in a vessel comprising the steps of: transmitting an optical measurement signal beam from a source toward the fluid boundary; diffusing the optical measurement signal beam before it reaches the fluid boundary; detecting a reflection of the signal beam from the fluid boundary; modulating the signal beam in response to the detected reflection, the modulating step including the steps of:

(a) causing the source to continually transmit the measurement signal beam at a first amplitude while the amplitude of the detected reflection is at a second amplitude, and (b) causing the source to continually transmit the measurement signal beam at the second amplitude while the amplitude of the detected reflection is at the first amplitude; and measuring a frequency of modulation of the signal beam, the frequency being indicative of a distance from the source to the fluid boundary.

16. The method of claim 15, wherein the transmitting step includes transmitting a collimated optical signal beam.

17. The method of claim 16, wherein the transmitting step includes generating an uncollimated beam at the source and collimating the uncollimated beam.

18. The method of claim 16, wherein the diffusing step includes diverging the collimated beam to a conical beam having a half angle of about 1°.

* * * * *